(12) United States Patent
Fink et al.

(10) Patent No.: US 11,627,819 B1
(45) Date of Patent: Apr. 18, 2023

(54) ANTI-THEFT SYSTEM AND METHOD FOR COSMETIC PRODUCTS

(71) Applicant: WALGREEN CO., Deerfield, IL (US)

(72) Inventors: Scott Fink, Chicago, IL (US); Nick Farinola, Coppell, TX (US)

(73) Assignee: WALGREEN CO., Deerfield, IL (US)

( * ) Notice: Subject to any disclaimer, the term of this patent is extended or adjusted under 35 U.S.C. 154(b) by 97 days.

(21) Appl. No.: 16/844,345

(22) Filed: Apr. 9, 2020

(51) Int. Cl.
| | |
|---|---|
| *A47F 3/00* | (2006.01) |
| *A47F 7/00* | (2006.01) |
| *A47F 1/12* | (2006.01) |
| *F16B 2/00* | (2006.01) |
| *F16B 2/22* | (2006.01) |

(52) U.S. Cl.
CPC ............. *A47F 3/002* (2013.01); *A47F 1/125* (2013.01); *A47F 7/00* (2013.01); *F16B 2/005* (2013.01); *F16B 2/22* (2013.01)

(58) Field of Classification Search
CPC .... F16B 2/005; F16B 2/22; A47F 7/00; A47F 1/125; A47F 3/002; A47F 1/126; A47F 1/12; A47F 1/04; A47F 5/0861; A47F 7/0007
See application file for complete search history.

(56) References Cited

U.S. PATENT DOCUMENTS

| | | | | | |
|---|---|---|---|---|---|
| 4,130,326 | A | * | 12/1978 | Hornblad | A47F 3/002 312/218 |
| 4,682,825 | A | * | 7/1987 | Crosslen | A47F 3/002 211/59.2 |
| 4,887,737 | A | * | 12/1989 | Adenau | A47F 1/126 221/3 |
| 5,408,775 | A | * | 4/1995 | Abramson | G09F 3/18 24/580.11 |
| 6,276,538 | B1 | * | 8/2001 | Battaglia | A47F 1/12 108/108 |
| 7,134,735 | B2 | * | 11/2006 | Cummings | A47F 3/002 312/114 |
| 7,150,365 | B2 | * | 12/2006 | Hardy | G09B 25/04 211/189 |
| 7,299,934 | B2 | * | 11/2007 | Hardy | A47F 1/125 211/59.2 |
| 7,451,881 | B2 | * | 11/2008 | Hardy | A47F 1/125 211/175 |
| 7,621,409 | B2 | * | 11/2009 | Hardy | A47F 3/002 211/184 |
| 7,661,545 | B2 | * | 2/2010 | Hardy | G08B 13/08 211/189 |
| 8,047,385 | B2 | * | 11/2011 | Hardy | A47F 1/12 211/59.3 |
| 8,113,601 | B2 | * | 2/2012 | Hardy | A47F 3/002 312/138.1 |

(Continued)

*Primary Examiner* — Patrick D Hawn
(74) *Attorney, Agent, or Firm* — Marshall, Gerstein & Borun LLP; Randall G. Rueth

(57) ABSTRACT

An anti-theft system for cosmetic products. The anti-theft system includes a fixture adapted to receive cosmetic products, and an anti-theft apparatus coupled to the fixture. The anti-theft apparatus includes a base and at least one finger extending from the base. The at least one finger is adapted to either contact or be disposed adjacent to at least one cosmetic product disposed within the fixture. So configured, the at least one finger is adapted to secure the at least one cosmetic product to the fixture.

17 Claims, 13 Drawing Sheets

(56) References Cited

U.S. PATENT DOCUMENTS

| | | | | |
|---|---|---|---|---|
| 8,136,682 B2* | 3/2012 | Hardy | .................... | A47F 1/126 |
| | | | | 211/189 |
| 8,152,006 B2* | 4/2012 | Wamsley | ................ | A47F 5/005 |
| | | | | 211/119.003 |
| 8,167,149 B2* | 5/2012 | Wamsley | ............... | A47F 5/0861 |
| | | | | 211/119.003 |
| 8,210,363 B2* | 7/2012 | Hardy | .................... | A47F 5/083 |
| | | | | 211/59.3 |
| 8,215,520 B2* | 7/2012 | Miller | .................... | A47F 3/002 |
| | | | | 221/129 |
| 8,235,227 B2* | 8/2012 | Hardy | .................... | A47F 1/125 |
| | | | | 211/59.3 |
| 8,397,922 B2* | 3/2013 | Kahl | ....................... | A47F 1/125 |
| | | | | 211/59.2 |
| 8,413,821 B2* | 4/2013 | Johnson | ................ | A47F 7/0246 |
| | | | | 211/40 |
| 8,622,227 B2* | 1/2014 | Bird | ..................... | A47F 5/0861 |
| | | | | 211/119.003 |
| 9,240,090 B2* | 1/2016 | Vogler | .................... | G07F 11/42 |
| 9,392,885 B2* | 7/2016 | Vogler | .................... | A47F 1/126 |
| 9,451,836 B2* | 9/2016 | Szpak | ....................... | A47F 1/04 |
| 9,687,085 B2* | 6/2017 | Hardy | ................ | A47B 87/0223 |
| 9,706,857 B2* | 7/2017 | Hardy | ....................... | A47F 1/12 |
| 9,844,280 B2* | 12/2017 | Dipaolo | .................... | A47F 3/02 |
| 11,045,017 B2* | 6/2021 | Padvoiskis | ............ | A47F 5/0807 |
| D937,611 S * | 12/2021 | Fink | ................ | D6/672 |
| 2004/0060944 A1* | 4/2004 | Gervasi | .................... | G08B 3/02 |
| | | | | 221/263 |
| 2005/0189369 A1* | 9/2005 | Vlastakis | ................ | A47F 3/002 |
| | | | | 221/123 |
| 2008/0283477 A1* | 11/2008 | Wamsley | .................. | A47F 1/04 |
| | | | | 211/4 |
| 2010/0017025 A1* | 1/2010 | Lockwood | ............. | G07F 9/026 |
| | | | | 700/240 |
| 2011/0042331 A1* | 2/2011 | Johnson | ................ | A47B 96/02 |
| | | | | 211/49.1 |
| 2011/0220597 A1* | 9/2011 | Sherretts | ................. | A47F 1/128 |
| | | | | 211/59.3 |
| 2011/0240569 A1* | 10/2011 | Kahl | ....................... | A47F 7/285 |
| | | | | 211/4 |
| 2012/0067917 A1* | 3/2012 | Obitts | ....................... | G07F 9/10 |
| | | | | 221/2 |
| 2012/0228242 A1* | 9/2012 | Vogler | ..................... | A47F 1/06 |
| | | | | 211/4 |
| 2012/0285906 A1* | 11/2012 | Bird | ..................... | A47F 5/0068 |
| | | | | 211/4 |
| 2013/0213906 A9* | 8/2013 | Bird | ..................... | A47F 5/0861 |
| | | | | 211/4 |
| 2018/0213946 A1* | 8/2018 | Vanos | .................... | A47F 5/005 |
| 2020/0273303 A1* | 8/2020 | Ewing | .................... | A47F 3/002 |

* cited by examiner

ANTI-THEFT SYSTEM AND METHOD FOR COSMETIC PRODUCTS

TECHNICAL FIELD

This disclosure relates to anti-theft systems for cosmetic products.

BACKGROUND

Traditional in-store shelving arrangements include products disposed on a tray disposed on a shelf, for example. These shelving arrangements enable customers to easily access and remove products from the shelf. In one example, a tray houses numerous cosmetic products, such as in a row-by-row format, allowing the tray to be easily placed in an in-store shelf. In this configuration, any of the cosmetic products in any row of the tray can be easily accessed and removed.

While such arrangements provide easy accessibility and removal of the product for the consumer, the products are generally not secured and/or locked within the trays. Said another way, there are typically no anti-theft mechanisms for such trays disposed on in-store shelves, allowing large quantities of products to be easily and quickly stolen.

In fact, little if any locking and/or anti-theft mechanisms for in-store cosmetic products exist at least because of the unique designs for various cosmetic products. For example, many cosmetic products have different heights, shapes, and packaging configurations, requiring more custom locking mechanisms for each type of cosmetic product when they are displayed. Thus, for at least this reason, it has been difficult to develop a more universal anti-theft and/or locking mechanism suitable for many types of cosmetic products.

SUMMARY

In accordance with one exemplary aspect of the present disclosure, an anti-theft system for cosmetic products comprises a fixture adapted to receive cosmetic products, and an anti-theft apparatus coupled to the fixture. The anti-theft apparatus includes a base and at least one finger extending from the base. The at least one finger is adapted to be one or more of in contact with or disposed adjacent to at least one cosmetic product disposed within the fixture. The at least one finger is also adapted to secure the at least one cosmetic product to the fixture.

In accordance with another exemplary aspect of the present disclosure, an anti-theft apparatus for use with a fixture having cosmetic products comprises a base having two ends and one of a shoulder portion or a tab extending from the base. The one of the shoulder portion or the tab is adapted to be coupled to the fixture. In addition, a plurality of fingers extends from the base and is adapted to one or more of contact or be disposed adjacent to at least one cosmetic product disposed within the fixture and secure the at least one cosmetic product to the fixture.

In accordance with another exemplary aspect of the disclosure, a method of securing at least one cosmetic product to a fixture comprises providing an anti-theft apparatus including a base having at least one tab and a plurality of fingers, and coupling the anti-theft apparatus to the fixture via the at least one tab. The method further comprises securing the at least one cosmetic product to the fixture via at least one finger of the plurality of fingers.

In further accordance with any one or more of the foregoing aspects and methods, one or more of the anti-theft system, the anti-theft apparatus or the method of securing at least one cosmetic product to a fixture may include any one or more of the following forms or method steps.

For example, in one form, the base may include two ends and a plurality of apertures disposed on either end. In addition, the at least one aperture of the plurality of apertures may be adapted to receive a fastening member to set a height of the anti-theft apparatus relative to the fixture.

In another form, a bracket may be coupled to the base, and the bracket may include two ends, each end having an aperture adapted to be aligned with at least one aperture of the plurality of apertures in the ends of the base to couple the bracket to the base via the fastening member. In addition, each end of the bracket may further include a tab adapted to be coupled to a portion of the fixture.

In yet another form, the base may include a longitudinal axis, and the at least one finger may extend from the base in a direction perpendicular to the longitudinal axis of the base.

Further, and in another form, the at least one finger may include a plurality of fingers, and the at least one finger of the plurality of fingers may be individually adjustable relative to one or more of the base and another finger of the plurality of fingers.

In another form, the at least one finger may include a plurality of fingers, and at least one finger of the plurality of fingers may include an end having a projection downwardly extending from the end. The projection may wrap over a portion of the at least one cosmetic product disposed on the fixture.

In yet another form, the base may include two ends and a shoulder portion downwardly extending from each end. In addition, the at least one finger may be disposed between the shoulder portions, and each shoulder portion may include an inwardly extending tab adapted to be coupled to a portion of the fixture.

In yet another form, the at least one finger may include a plurality of fingers, and the at least one finger of the plurality of fingers may be adapted to be disposed on a side of the at least one cosmetic product. The plurality of fingers may form at least one tunnel to receive and secure the at least one cosmetic product to the fixture.

In another form, each shoulder may further include a downwardly extending projection having an inwardly extending flange and a tab extending from the flange. The tab may be adapted to be inserted into a portion of the fixture to set a height of the anti-theft apparatus relative to the fixture.

In yet another form, the base may include two ends and a tab downwardly extending from each end of the base. Each tab may be adapted to be inserted into a slot in the fixture to couple the anti-theft apparatus to the fixture.

In another form, at least one finger may comprise a plurality of fingers, and the plurality of fingers may include a plurality of pushers inwardly extending from the base. A collar may be disposed between at least one pusher of the plurality of pushers, and the collar may be adapted to engage the at least one cosmetic product.

In yet another form, the at least one finger may be at least one peg hook with a coating. The coating may include one or more of powder texture or rubber dip, and the at least one peg hook may be adapted to receive at least one cosmetic product.

In another form, the peg hook may include a body having a first end and a second end. The first end may be adapted to be coupled to the base and the second end may have an upwardly extending portion through which the at least one cosmetic product is moved to remove from the fixture.

In one method, coupling the anti-theft apparatus to the fixture via the at least one tab of the base may comprise one of: (1) inserting a tab disposed on each end of a bracket attached to each end of the base into a slot in the fixture; (2) inserting a tab disposed on each end of a shoulder extending from each end of the base into a slot in the fixture; or (3) inserting a tab disposed on each end of the base into a slot in the fixture.

In another method, securing the at least one cosmetic product to the fixture via at least one finger of the plurality of fingers may comprise one of: (1) disposing a tab of at least one finger of the plurality of fingers into contact with at least one cosmetic product, such that movement of the at least one finger is required to access the at least one cosmetic product; (2) disposing at least one finger of the plurality of fingers on either side of the at least one cosmetic product, forming a tunnel for receiving the at least one cosmetic product; and (3) the plurality of fingers comprising a plurality of pushers, and disposing at least one pusher of the plurality of pushers on either side of at least one cosmetic product and engaging the at least one cosmetic product with a collar disposed between two pushers of the plurality of pushers.

BRIEF DESCRIPTION OF THE DRAWINGS

The Figures described below depict various aspects of the system and methods disclosed therein. It should be understood that each figure depicts an example of a particular aspect of the disclosed system and methods, and that each of the figures is intended to accord with a possible example thereof. Further, wherever possible, the following description refers to the reference numerals included in the following figures, in which features depicted in multiple figures are designated with consistent reference numerals.

There are shown in the drawing arrangements which are presently discussed, it being understood, however, that the present examples are not limited to the precise arrangements and instrumentalities shown, wherein.

DETAILED DESCRIPTION

Generally, an anti-theft system for cosmetic products is disclosed. The anti-theft system includes a fixture having cosmetic products disposed therein and an anti-theft apparatus coupled to the fixture. The anti-theft apparatus includes a base having two ends and one of a shoulder portion or a tab extending from the base, where one of the shoulder portion or the tab is coupled to the fixture. The anti-theft apparatus further includes a plurality of fingers extending from the base and adapted to contact at least one cosmetic product disposed in the fixture to secure the at least one cosmetic product to the fixture. In one example, at least one finger of the plurality of fingers is individually adjustable relative to at least another finger of the plurality of fingers and includes an end having a tab, such that the tab wraps over a portion of at least one cosmetic product. In another example, the plurality of fingers are disposed on either side of the at least one cosmetic product to form a tunnel adapted to receive and secure the at least one cosmetic product. In yet another example, the plurality of fingers includes a plurality of pushers inwardly extending from the base, and further comprising a collar disposed between the at least two pushers of the plurality of pushers. The collar engages the at least one cosmetic product.

Figure 1:
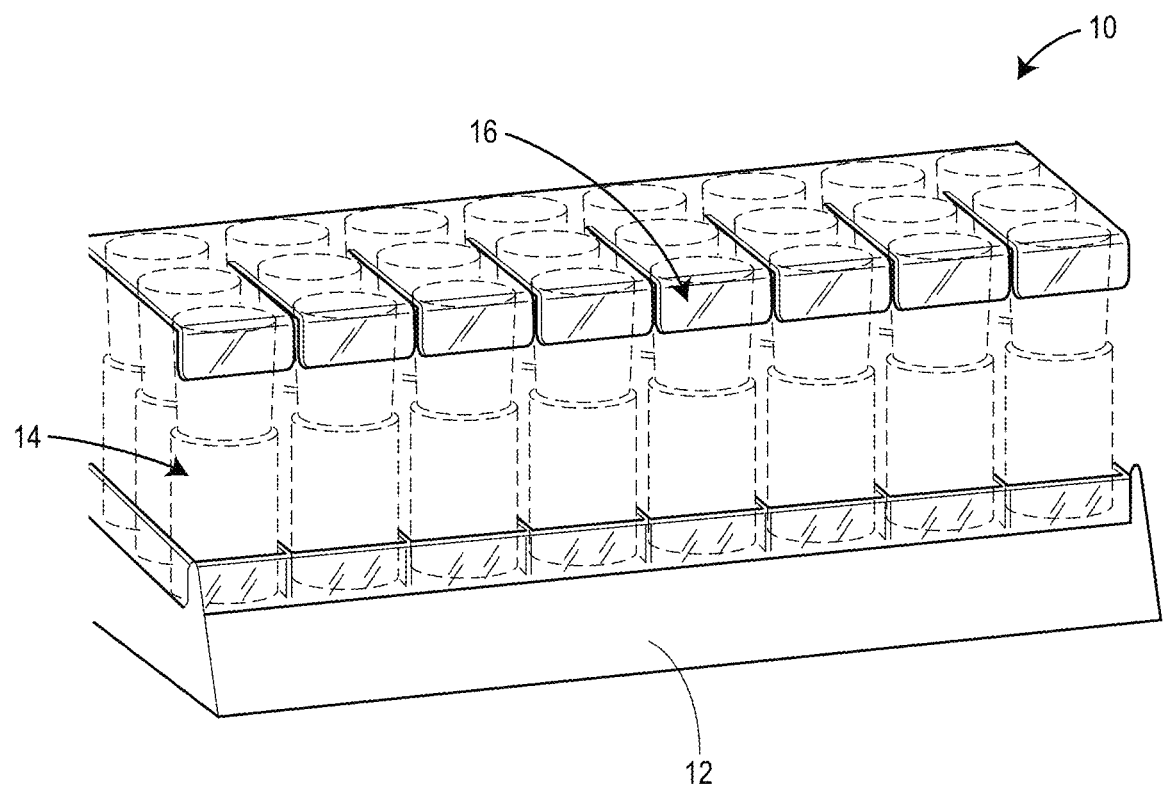
FIG. 1 is a perspective view of an anti-theft system according to one aspect of the present disclosure.
Figure 2:
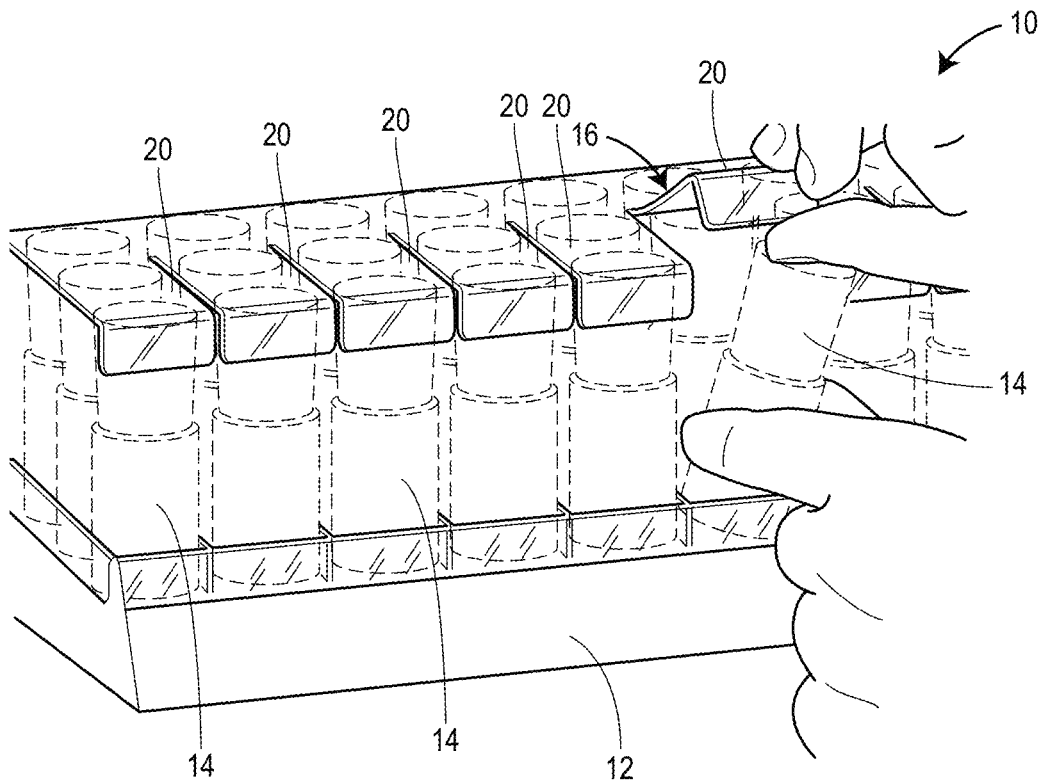
FIG. 2 is another perspective view of the anti-theft system of FIG. 1 with a portion of the anti-theft system being moved away from a cosmetic product to provide access to the cosmetic product.

Referring now to FIGS. 1 and 2, an anti-theft system 10 according to one aspect of the present disclosure is depicted. The anti-theft system 10 includes a fixture 12 adapted to receive at least one cosmetic product 14. An anti-theft apparatus 16 is coupled to the fixture 12 and is adapted to contact the at least one cosmetic product 14 disposed in the fixture 12 to secure the at least one cosmetic product 14 to the fixture 12. As depicted in FIG. 2, a portion of the anti-theft apparatus 16 is moved, such as manually moved by a user in this example, out of contact with the at least one cosmetic product 14. As a result, the at least one cosmetic product 14 is able to be removed from the fixture 12, as explained more below.

In one example, the fixture 12 is a tray that is commonly and universally used in many stores to display cosmetic products on a shelf. In another example, the fixture 12 may be any other commonly used structure, such as a portion of commonly used in-store shelving arrangement, that houses and/or stores cosmetic products. The cosmetic products may include any known cosmetic product, including but not limited to any skincare products, such as No7 skincare products, lipsticks, foundation, creams, lotions, eyemake-up remover, blush, and/or any other cosmetic product typically merchandised in a similar manner, such as a vertical orientation.

Figure 3:
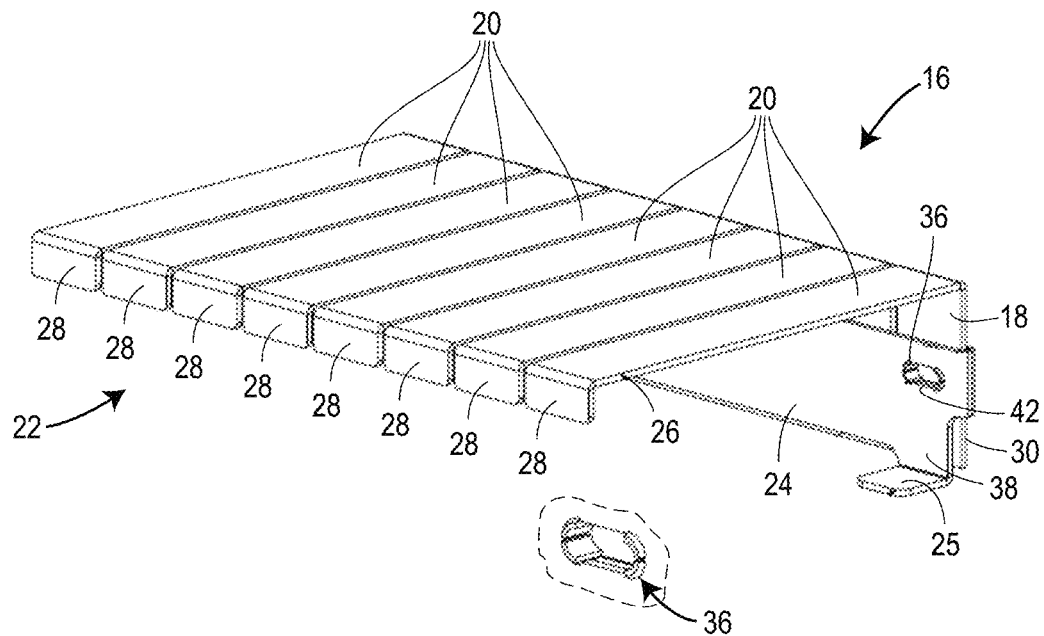
FIG. 3 is a perspective view of an anti-theft apparatus of the anti-theft system of FIG. 1.
Figure 4:
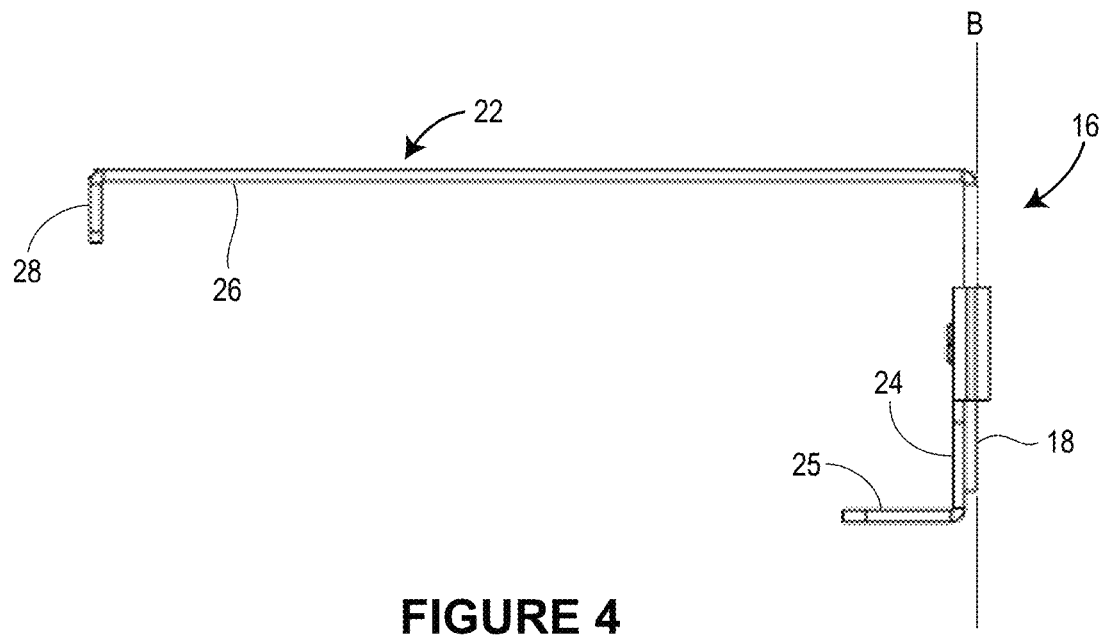
FIG. 4 is a side view of the anti-theft apparatus of FIG. 3.

Referring now to FIGS. 3 and 4, the anti-theft apparatus 16 of the anti-theft system 10 is depicted. The anti-theft apparatus 16 includes a base 18 and at least one finger 20 extending from the base 18. In one example, the at least one finger 20 is a plurality of fingers 22, as depicted in FIG. 3. The at least one finger 20 is adapted to secure the at least one cosmetic product 14 to the fixture 12. A bracket 24 is coupled to the base 18 to help set the height of the anti-theft apparatus 16 on the fixture 12, for example, as explained more below. The bracket 24 further includes at least one tab 25 adapted to be inserted into a portion of the fixture 14 to couple the anti-theft apparatus 16 to the fixture 12. So configured, the tab 25 provides a further support mechanism to securely couple the base 18 of the anti-theft apparatus 16 and the bracket 24 to the fixture 12. The base 18 includes a longitudinal axis B (FIG. 4), and the at least one finger 20 extends from the base 18 in a direction perpendicular to the longitudinal axis B of the base 18. Said another way, the at least one finger 20 is disposed at a 90 degree angle from the longitudinal axis B of the base 18, as depicted in FIG. 4.

In addition, the at least one finger 20 of the plurality of fingers 22 is individually adjustable relative to one or more of the base 18 and any other finger 20 of the plurality of fingers 22. For example, and as depicted in part in FIG. 2, the at least one finger 20 of the plurality of fingers 22 is adjusted, such as moved away from the at least one cosmetic product 14 to provide access to the at least one cosmetic product 14. As will be understood, more than one finger 20 of the plurality of fingers 22 may be moved in a direction, such as away from the cosmetic product 14, to allow access to the cosmetic product 14. However, each finger 20 of the plurality of fingers 22 must be moved to access the corresponding cosmetic product 14 that is contact with the at least one finger 20, slowing down a rate at which a large quantity of cosmetic products 14 may be removed from the fixture 12.

Further, the at least one finger 20 of the plurality of fingers 22, and in one example, all of the fingers 20 of the plurality of fingers 22, includes an end 26 having a projection 28 downwardly extending from the end 26. The projection 28 wraps over a portion of the at least one cosmetic product 14 disposed on the fixture 12, as depicted in FIG. 1, further securing the cosmetic products 14 to the fixture 12.

Figure 5:
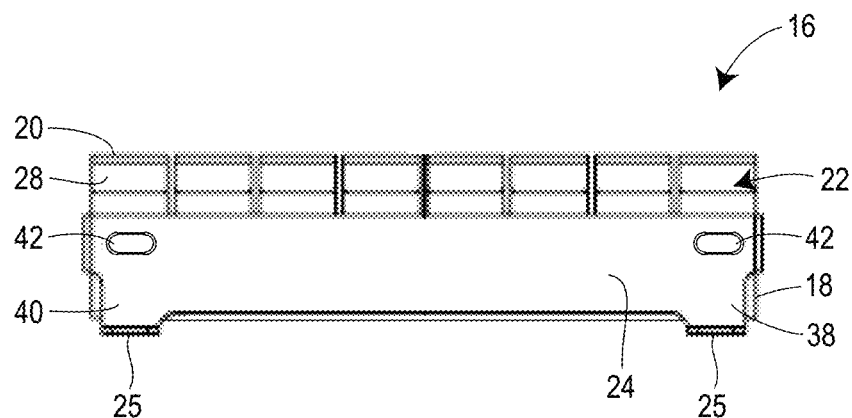
FIG. 5 is a front view of the anti-theft apparatus of FIG. 3.
Figure 6:
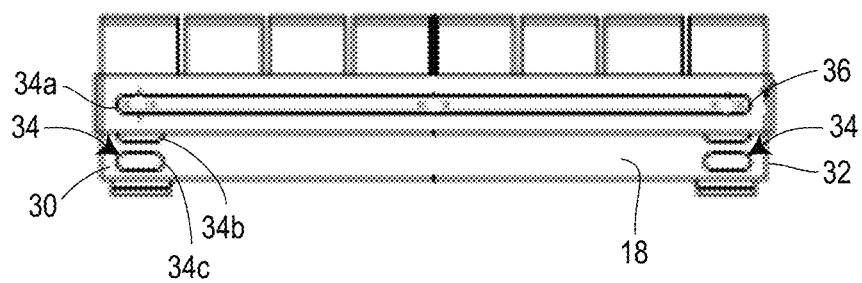
FIG. 6 is a rear view of the anti-theft apparatus of FIG. 3.

Referring now to FIGS. 5 and 6, the base 18 further includes two ends 30, 32 and plurality of apertures 34 disposed on each end 30, 32. At least one aperture of the plurality of apertures 34 is adapted to receive a fastening member 36 (FIG. 3) to help set a height of the anti-theft apparatus 16 on the fixture 12. More specifically, and in one example, the plurality of apertures 34 may include three apertures in a vertical configuration, with a top aperture 34a, a middle aperture 34b, and a bottom aperture 34c. In the example of FIG. 6, the fastening member 36 is secured to the top apertures 34a of the plurality of apertures 34 to set the height of the anti-theft apparatus 16 on the fixture 12. If another height is desired, the fastening member 36 may alternatively be secured to one of the middle apertures 34b or the bottom apertures 34c. Further, the fastening member 36 may include a snap 36 (see, e.g., FIG. 3) or a plug 36 (see, e.g., FIG. 6) or any other member capable of securing the base 18 of the anti-theft apparatus 16 to the fixture 12.

As depicted in FIGS. 3 and 5, and in another example, the bracket 24 includes two ends 38, 40, and each end 38, 40 includes an aperture 42. The apertures 42 are adapted to be aligned with at least one aperture 34a, 34b, 34c of the plurality of apertures 34 of the base 18 of the anti-theft apparatus 16 to couple the bracket 24 to the base 18 via fastening member 36. For example, the apertures 42 of the bracket 24 may be aligned with one of the apertures 34a, 34b, 34c of the base 18. The fastening member 36 may then be secured through the apertures 42 of the bracket 24, the one of the apertures 34a, 34b, 34c of the base 18 of the anti-theft apparatus 16, and into a portion of the fixture 12.

Figure 7A:
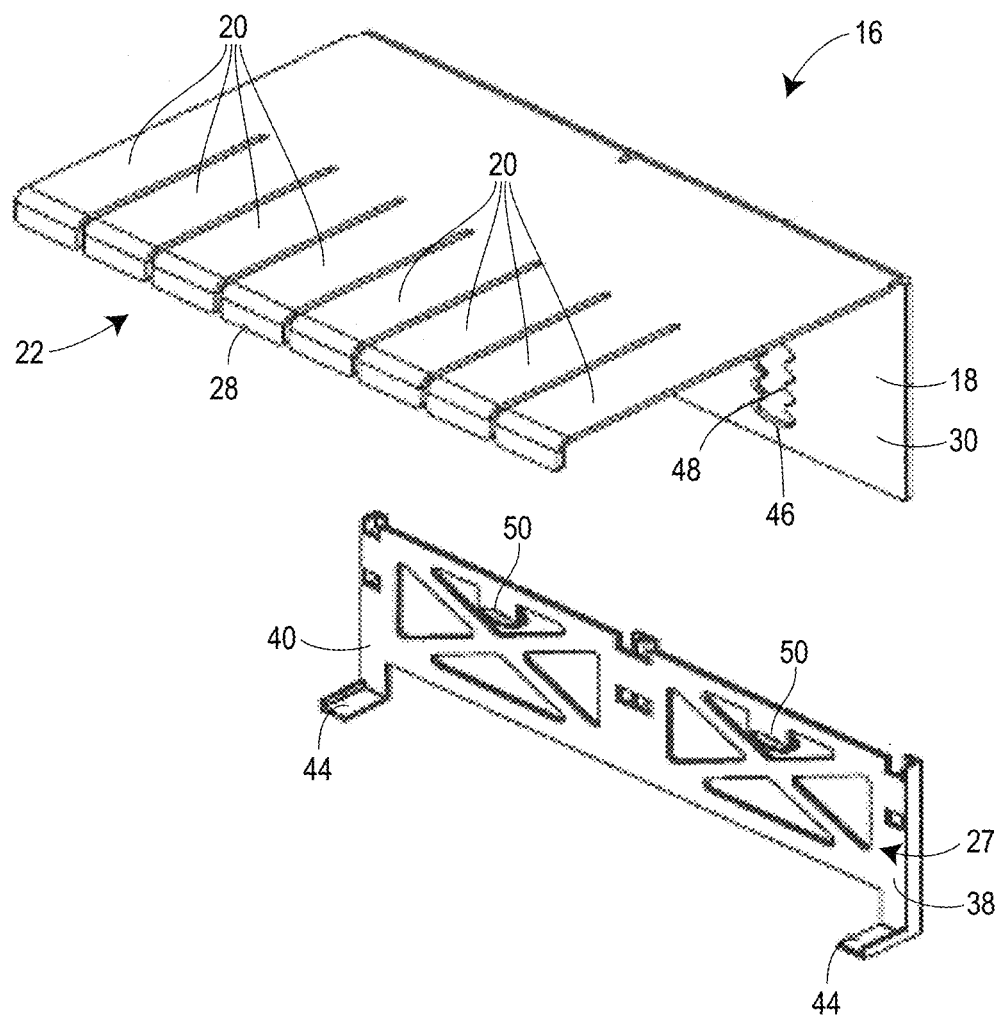
FIG. 7A is a perspective view of another anti-theft system according to another aspect of the present disclosure.

Referring now to FIG. 7A, the anti-theft apparatus 16 of FIGS. 1-6 is depicted with some modifications. Namely, the anti-theft apparatus 16 of FIG. 7A includes a different aperture 46 in the base 18 and a different bracket 27. However, all other parts of the anti-theft apparatus 16 of FIG. 7A that are identical to the anti-theft apparatus 16 of FIGS. 1-6 have the same reference number and are not explained here again for the sake of brevity.

As depicted in FIG. 7A, the aperture 46 of the base 18 is one of a pair of longitudinal apertures having a plurality of teeth 48 extending into the aperture 46. The first aperture 46 is disposed between the end 30 of the base 18 and a center (not depicted) of the base 18. The second aperture (not depicted) is disposed between the other end (not shown) of the base 18 and the center of the base 18. In addition, the bracket 27 includes the first and second ends 38, 40, respectively, each of which includes a tab 44 extending therefrom, and two apertures 50, one of which is disposed right of center of the bracket 27, e.g., between the center of the bracket 27 and the first end 38. The other aperture 50 is disposed left of center of the bracket 27, e.g., between the center of the bracket 27 and the second end 40. So configured, the apertures 50 are aligned with the apertures 46 of the base 18 and at least one aperture of the fixture 12. A fastening member, such as the fastening member 36 described above, is then disposed within the apertures to secure the bracket 27 to the base 18 and the anti-theft apparatus 16 to the fixture 12. In one example, the fastening member 36 is secured within the aperture 46 of the bracket 18 by at least one tooth 48 of the plurality of teeth 48 at a location corresponding to a desired height of the anti-theft apparatus 16 relative to the fixture 12, for example. Thus, in this example, the fastening member 36 includes a portion that contacts one or more teeth of the plurality of teeth 48 to secure the anti-theft apparatus 16 to the fixture 12.

Figure 7B:
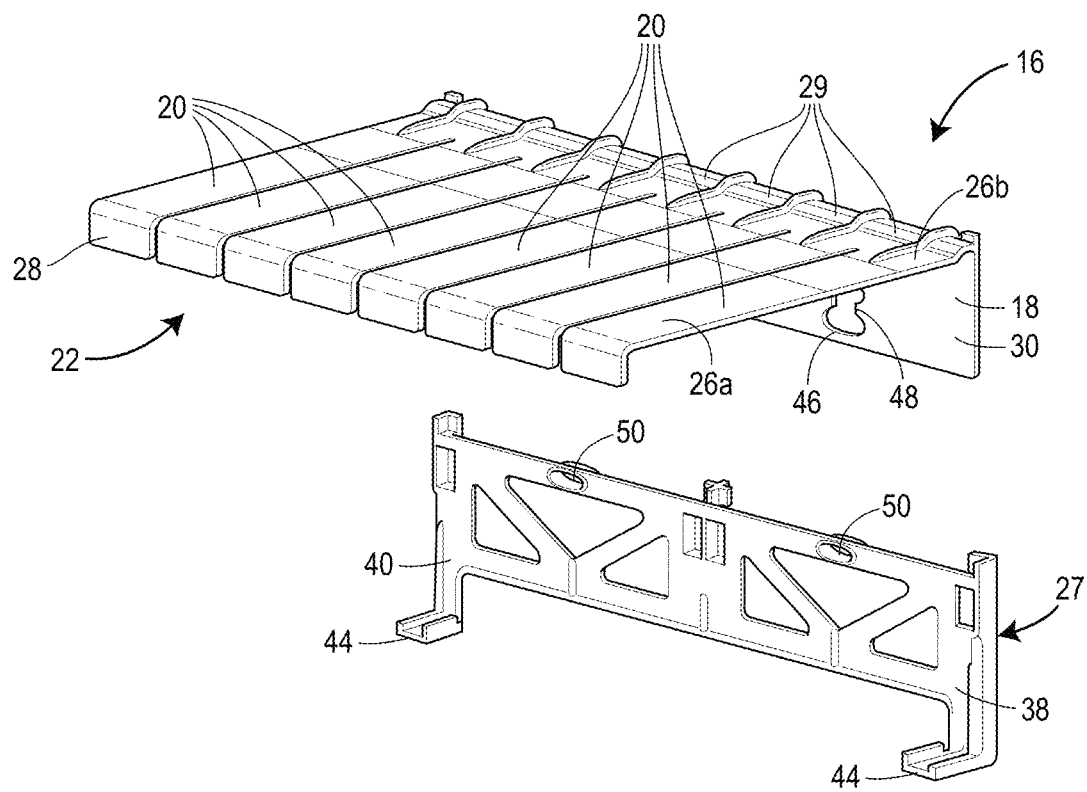
FIG. 7B is a perspective view of another anti-theft system according to another aspect of the present disclosure.
Figure 7C:
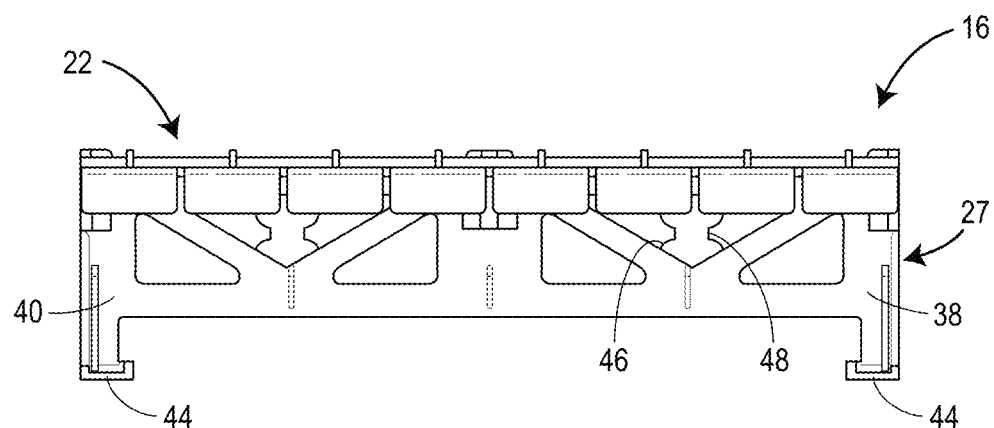
FIG. 7C is a front view of a portion of the anti-theft system of FIG. 7B.

Referring now to FIGS. 7B and 7C, the anti-theft system 16 of FIG. 7A is depicted with some minor modifications. Namely, the fingers 20 of the plurality of fingers 22 of anti-theft apparatus 16 of FIG. 7B include a rounded end 26b. More specifically, at least one finger 20 includes a first end 26a having the projection 28 extending therefrom. The at least one finger 20 also includes a second end 26b disposed opposite the first end 26a that includes a rounded and/or raised portion 29. Said another way, the second end 26b may include a curved portion 29 as part of the design of the at least one finger 20. In this example, each finger 20 of the plurality of fingers 22 includes the second end 26b have the rounded and/or raised portion 28, as depicted in FIG. 7B. In addition, the tabs 44 extending from each end 38, 40 of the bracket 27 have a slightly different design. For example, each tab 44 includes two side portions, forming a channel section in the tab 44. This is unlike the tab 44 of the bracket 27 of FIG. 7A, which includes only one side portion in each tab 44. In the tab 44 of the bracket 27 of FIG. 7B, the two side walls help further secure the bracket 27 to the fixture 12, for example. All other parts of the anti-theft apparatus 16 of FIG. 7A that are the same as or essentially the same as the anti-theft apparatus 16 of FIGS. 1-6 have the same reference number and are not explained here again for the sake of brevity.

Figure 7D:
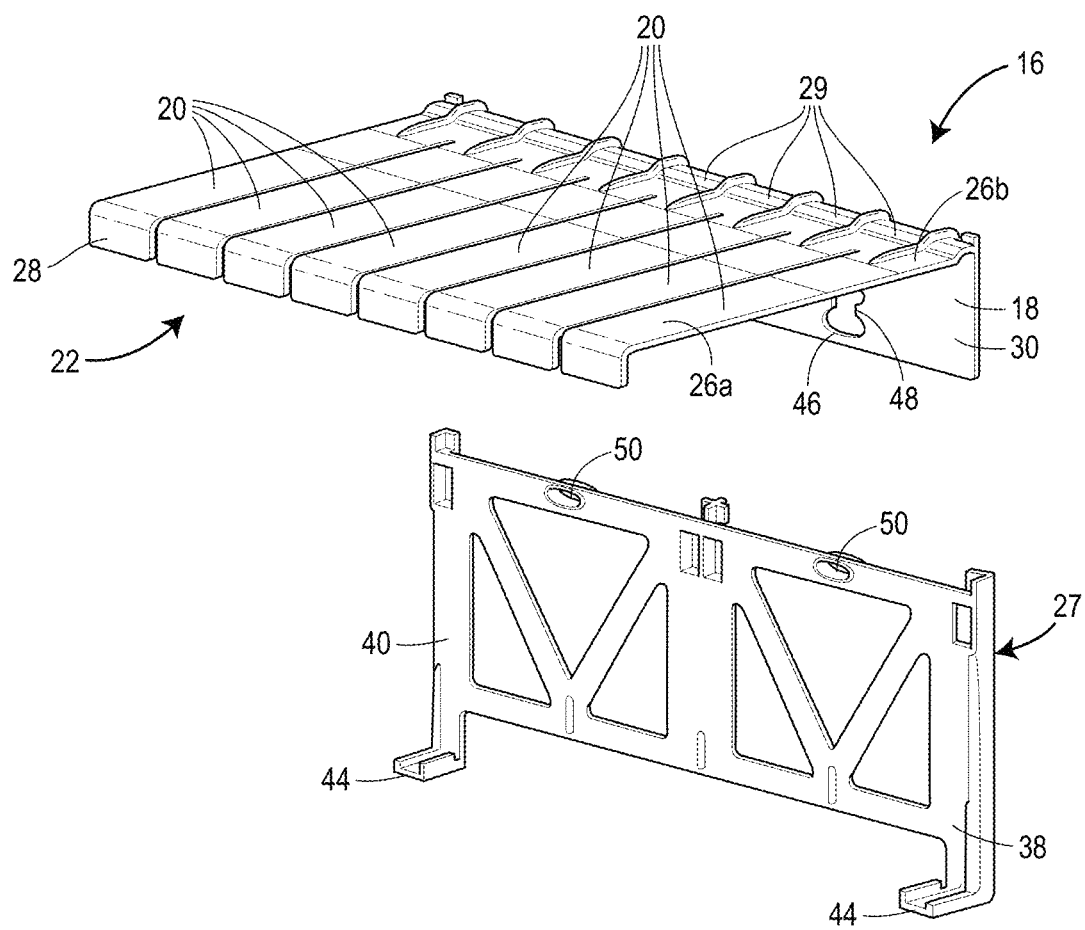
FIG. 7D is a perspective view of another anti-theft system according to another aspect of the present disclosure.
Figure 7E:
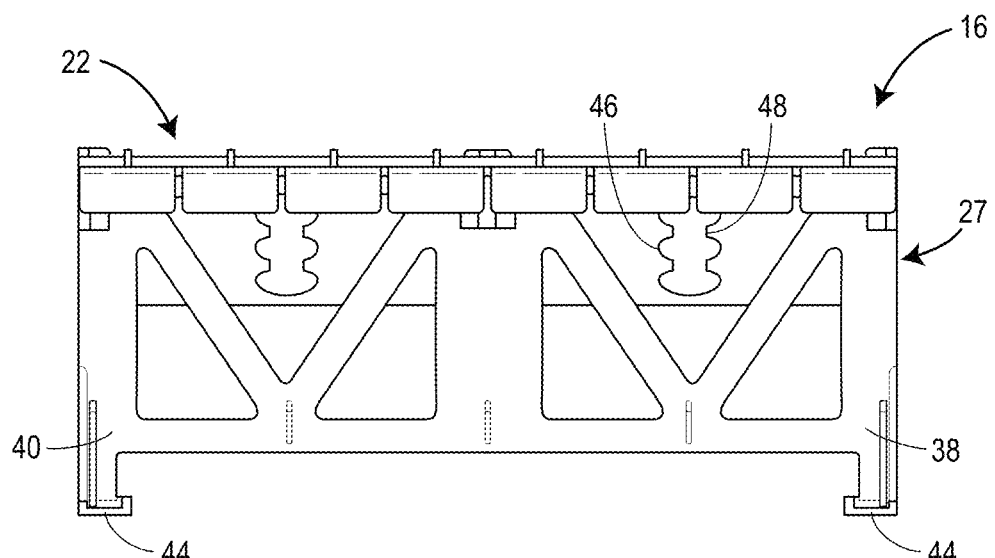
FIG. 7E is a front view of a portion of the anti-theft system of FIG. 7D.

Referring now to FIGS. 7D and 7E, the anti-theft system 16 of FIG. 7A is depicted with some alternative features. Namely, and like the fingers 20 of the anti-theft system 16 of FIGS. 7B and 7C, the fingers 20 of the plurality of fingers 22 of anti-theft apparatus 16 of FIG. 7D also include the rounded end 26b. In addition, the tabs 44 extending from each end 38, 40 of the bracket 27 have a slightly different design. For example, each tab 44 includes two side portions, forming the channel section in the tab 44. This is unlike the tab 44 of the bracket 27 of FIG. 7A, which includes only one side portion in each tab 44. In the tab 44 of the bracket 27 of FIG. 7B, the two side walls help further secure the bracket 27 to the fixture 12, for example. Further, the bracket 27 is taller, e.g., has a greater height, than the bracket 27 of FIGS. 7A, 7B and 7C. In this way, the anti-theft system 16 of FIGS. 7D and 7E is able to accommodate different sized shelving units, for example, and/or display cosmetic products within the anti-theft system 16 at a different height than that anti-theft system 16 of FIGS. 7A, 7B, and 7C, for example. All other parts of the anti-theft apparatus 16 of FIG. 7A and FIGS. 7B and 7C that are the same as or essentially the same as the anti-theft apparatus 16 of FIGS. 1-6 have the same reference number and are not explained here again for the sake of brevity.

Referring now to FIGS. 8-13, an anti-theft system 110 having an anti-theft apparatus 116 according to another aspect of the present disclosure is depicted. Like the anti-theft apparatus 16 of FIGS. 1-7, the anti-theft apparatus 116 is coupled to the fixture 112 to secure one or more cosmetic products 114 to the fixture 112. Parts of the anti-theft apparatus 16 of FIGS. 1-7 that are similar to parts of the anti-theft apparatus 116 are numbered 100 more than the parts of the anti-theft apparatus 16.

Figure 8:
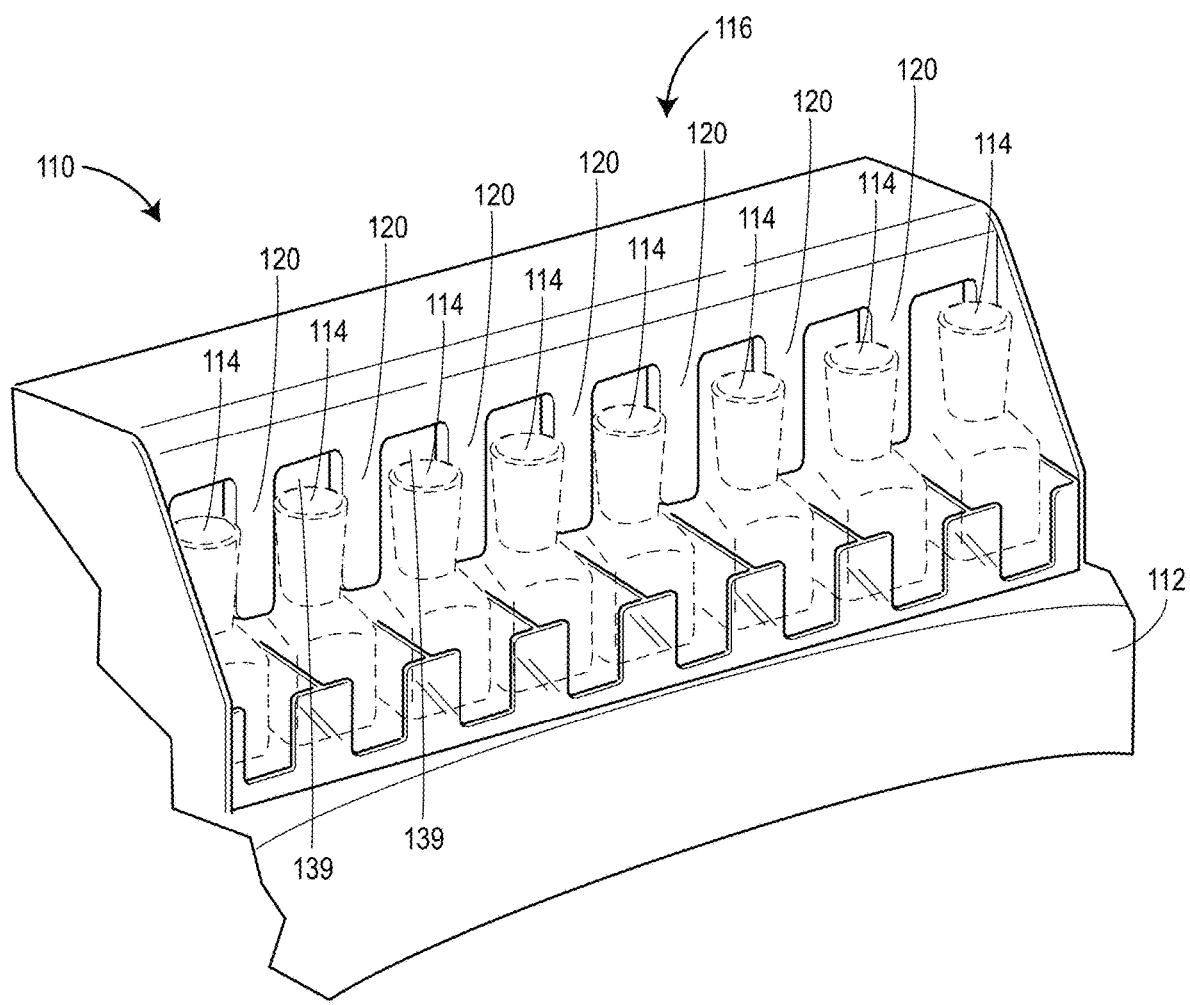
FIG. 8 is a perspective view of another anti-theft system according to another aspect of the present disclosure.
Figure 9A:
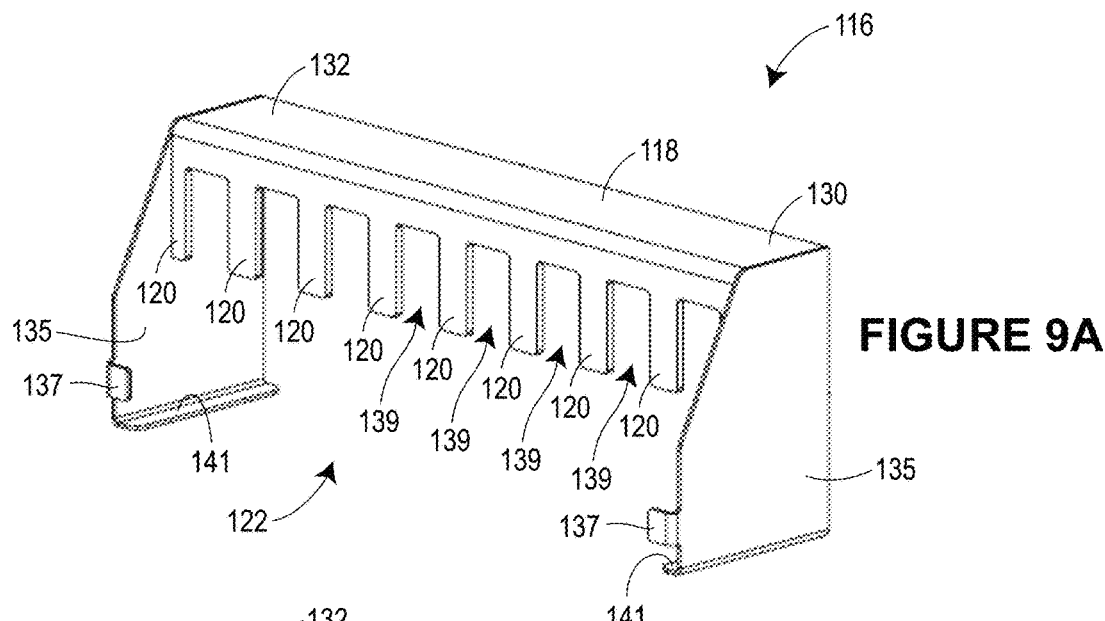
FIG. 9A is a perspective view of an anti-theft apparatus of the anti-theft system of FIG. 8.
Figure 10:
FIG. 10 is a top view of the anti-theft apparatus of FIG. 9A.

Referring now to FIGS. 9A and 10, and like the anti-theft apparatus 16, the anti-theft apparatus 116 includes a base 118 and at least one finger 120 extending from the base 118 and adapted to one or more of contact or be disposed adjacent to at least one cosmetic product 114 (FIG. 8) disposed within the fixture 112. In addition, and as explained more below, the at least one finger 120 secures the at least one cosmetic product 114 to the fixture 112, making rapid removal of a large quantity of cosmetic products 114 from the fixture 112 difficult.

Figure 11:
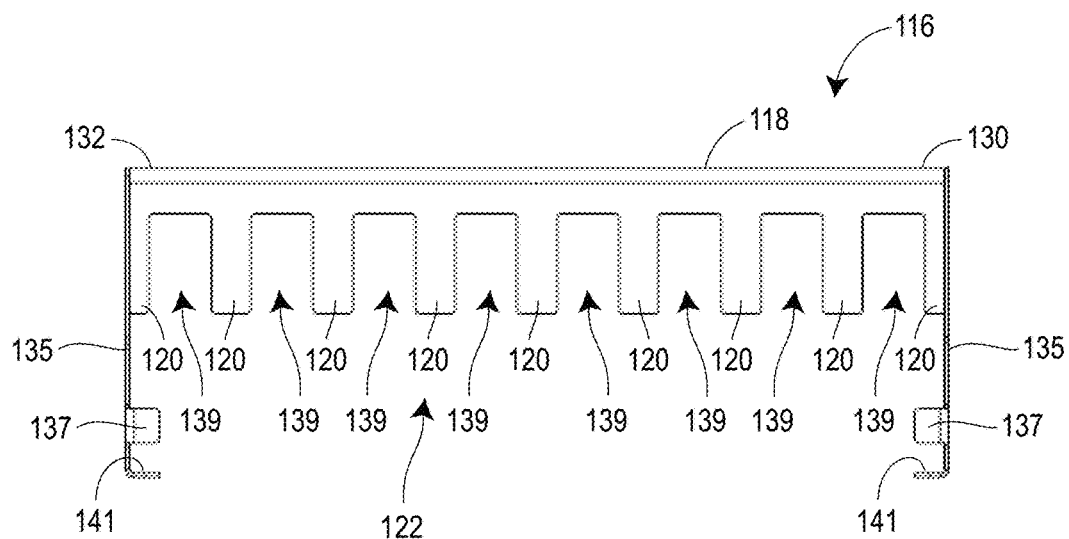
FIG. 11 is a front view of the anti-theft apparatus of FIG. 9A.

The base 118 includes two ends 130, 132 disposed opposite each other and a shoulder portion 135 downwardly extending from each end 130, 132. The at least one finger 120 is disposed between the shoulder portions 135, and each shoulder portion 135 includes a inwardly extending tab 137 adapted to be inserted into a portion of the fixture 112 to secure the anti-theft apparatus 116 to the fixture 112. In one example, and as depicted in FIGS. 9A and 11, the at least one finger 120 includes a plurality of fingers 122. The plurality of fingers 122 are adapted to be disposed on either side of the at least one cosmetic product 114 and form at least one tunnel 139 to receive and help secure the at least one cosmetic product 114 to the fixture 112.

In addition, in some examples, the shoulder portions 135 may further include an inwardly extending flange 141. Each inwardly extending flange 141 may also be coupled to a portion of the fixture 112, such as inserted into an opening or a slot of the fixture 112 to further secure the anti-theft apparatus 116 to the fixture 112. Once coupled to the fixture 112, the inwardly extending tabs 137 of the anti-theft apparatus 116 also function as a barrier, such as a gate, which helps prevent the cosmetic products 114 from being easily removed from the fixture 114.

Figure 9B:
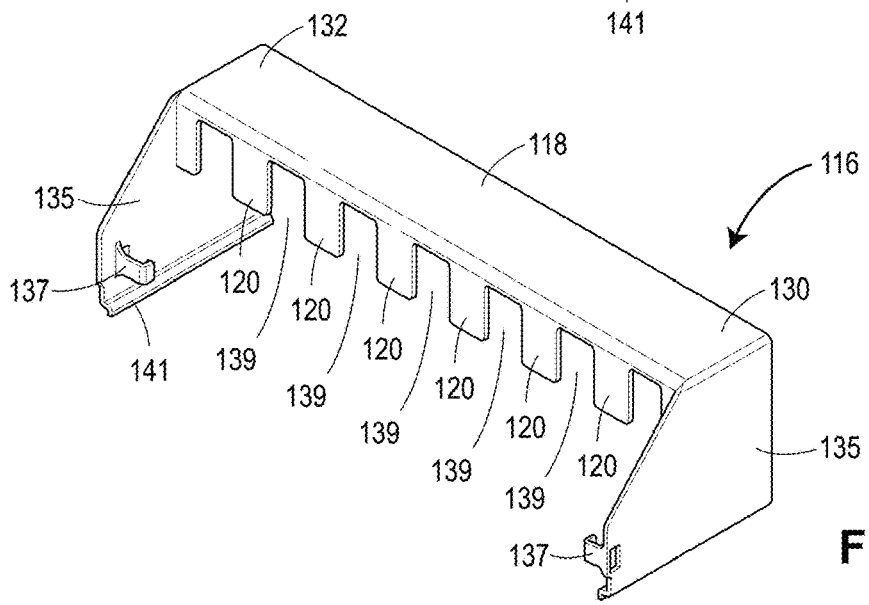
FIG. 9B is a perspective view of another anti-theft apparatus that may alternatively be used with the anti-theft system of FIG. 8.

Referring now to FIG. 9B, the anti-theft apparatus of FIGS. 9A and 10 is provided with some modifications. For example, the tabs 137 extending from an inside surface of the shoulders 135 extend from a more central area of the inside surface of the shoulders 135 and not an edge of each shoulder 135, as in the anti-theft apparatus of FIGS. 9A and 10. In addition, the shoulders 135 have a size different from the shoulders 135 of FIGS. 9A and 10. For example, the shoulders 135 in FIG. 9B are not as tall and extend farther outward from the base 118 than the shoulders 135 in FIG. 9A, for example. As will be appreciated, various other shapes and sizes of the shoulders 135 and locations and configurations of the tabs 137 may alternatively be included and still fall within the scope of the present disclosure. In addition, parts of the anti-theft apparatus 116 of FIG. 9B that are the same or essentially the same as parts of the anti-theft apparatus 116 of FIG. 9A have the same reference numbers.

Figure 9C:
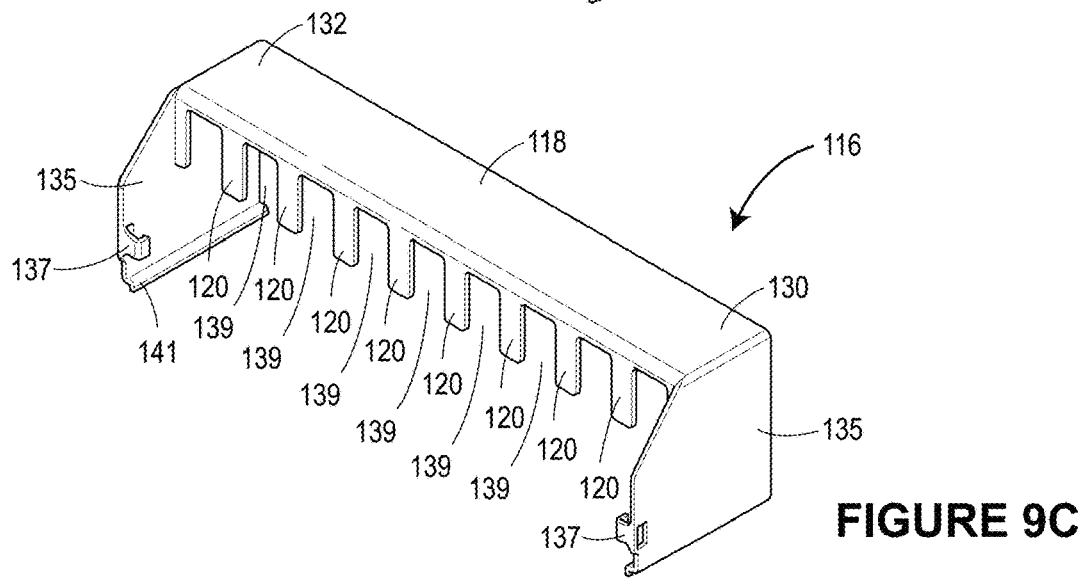
FIG. 9C is a perspective view of another anti-theft apparatus that may alternatively be used with the anti-theft system of FIG. 8

Referring now to FIG. 9C, the anti-theft apparatus 116 of FIGS. 9A and 10 is again provided with some further alternative modifications. More specifically, in this example, there are more fingers 120 of the plurality of fingers 122. As a result, the anti-theft apparatus 116 of FIG. 9C is longer than the anti-theft apparatus 116 of both FIGS. 9A and 9B, for example. In addition, because there are more fingers 120, there are likewise more tunnels 139 in the anti-theft apparatus 116 of FIG. 9C compared to the anti-theft apparatus 116 of FIGS. 9A and 9B. Again, and as noted above, various other numbers of fingers and/or tunnels, such as removing the fingers and/or adding more fingers, may alternatively be included and still fall within the scope of the present disclosure. Further, various sizes, shapes, widths, and lengths of each finger may alternatively be provided and still fall within the scope of the present disclosure. Parts of the anti-theft apparatus of FIG. 9C that are the same or essentially the same as parts of the anti-theft apparatus 116 of FIG. 9A have the same reference numbers.

As depicted in FIG. 11, for example, the plurality of fingers 122 form the at least one tunnel 139 to receive and to secure the at least one cosmetic product 114 to the fixture 112. In other examples, the plurality of fingers 122 form a plurality of tunnels 139, such that each tunnel 139 is disposed between two fingers 120 of the plurality of fingers 122. In this way, the cosmetic products 114 may be disposed in a single row within each tunnel 139, with a finger 120 disposed on either side of the first cosmetic product 114 of the row of cosmetic products, for example (FIG. 8).

Figure 12:
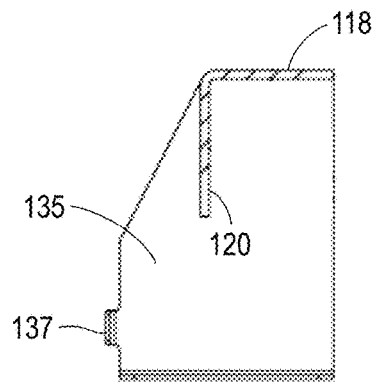
FIG. 12 is a sectional view of the anti-theft apparatus of FIG. 11 taken along the line A-A of FIG. 11.

Referring now to FIG. 12, the at least one finger 120 of the plurality of fingers 122 may include the same material as the base 118. For example, the at least one finger 120 of the plurality of fingers 122 may extend from the base 118 as one molded part. In addition, and in another example, each finger 120 of the plurality of fingers 122 may extend from the base 118, such that the base 118 and the plurality of fingers 122 are a single molded part.

Figure 13A:
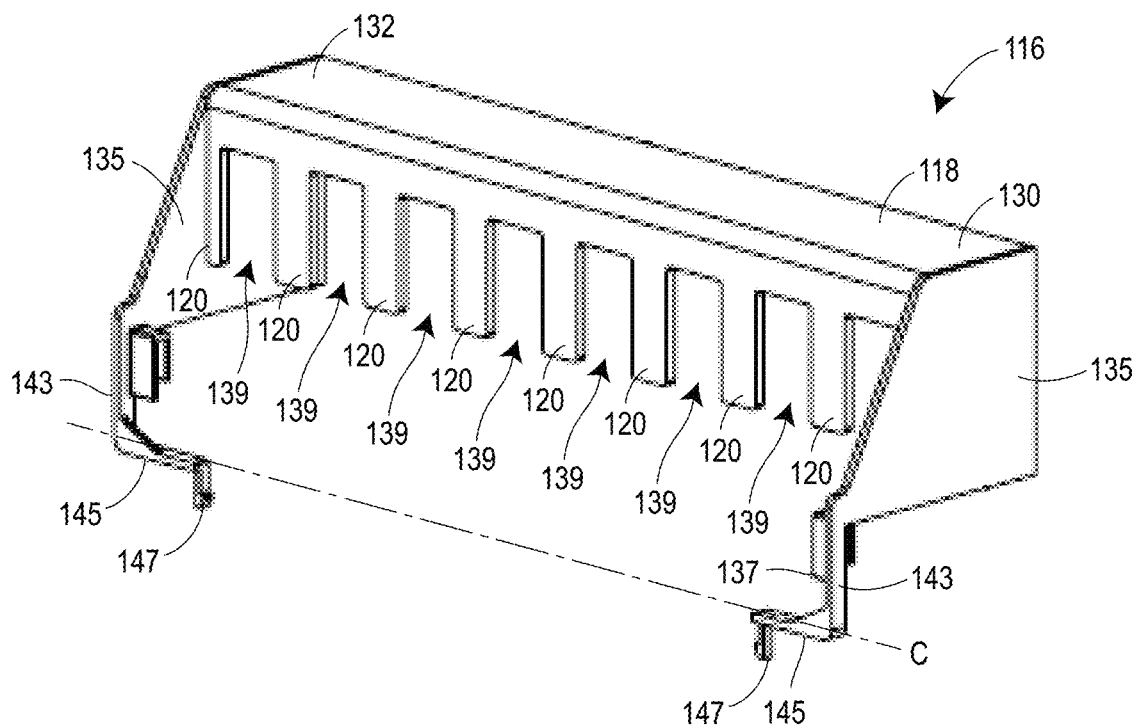
FIG. 13A is a perspective view of another anti-theft apparatus that may alternatively be used in the anti-theft system of FIG. 8.

Referring now to FIG. 13A, the anti-theft apparatus 116 may further include a projection 143 downwardly extending from each shoulder 135. At least one downwardly extending projection 143, and as depicted in FIG. 13A, or both of the downwardly extending projections 143, may further include an inwardly extending flange 145. Further, a tab 147 may also extend from the inwardly extending flange 145. In this example, the tab 147 downwardly extends from the inwardly extending flange 145 at an angle that is perpendicular to an axis C of the inwardly extending flange 145. The tabs 147 are adapted to be inserted into the fixture 112 to set a height of the anti-theft apparatus 116 relative to the fixture 112. Said another way, the downwardly extending projections 143 serve to increase the height of the anti-theft apparatus 116, such that the anti-theft apparatus 116 may be disposed and/or coupled to the fixture 112 at a height greater that the anti-theft apparatus 116 of FIGS. 8-12. So configured, the anti-theft apparatus 116 to accommodates larger cosmetic products 114 in the fixture 112, for example.

Figure 13B:
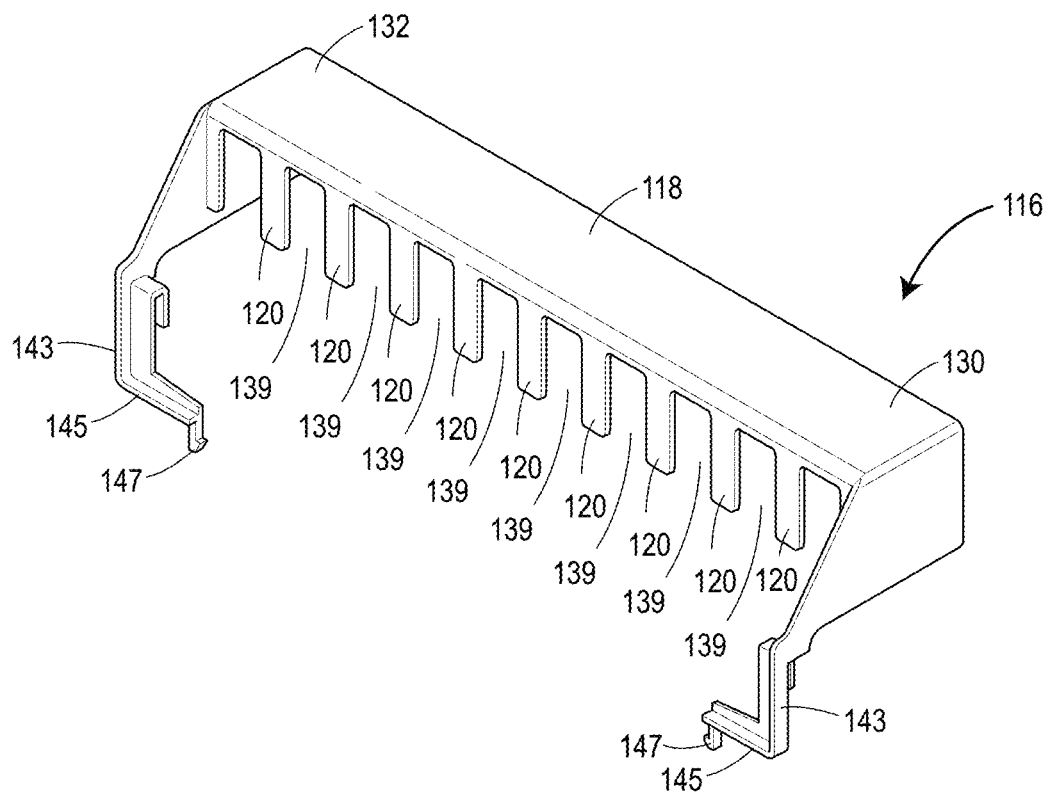
FIG. 13B is a perspective view of another anti-theft apparatus that may be used in the anti-theft system of FIG. 8.

Referring now to FIG. 13B, the anti-theft apparatus 116 of FIG. 13A is depicted with some modifications. More specifically, in this example, there are again more fingers 120 of the plurality of fingers 122. As a result, the anti-theft apparatus 116 of FIG. 13B is longer than the anti-theft apparatus 116 of FIG. 13A for example. In addition, because there are more fingers 120, there are likewise more tunnels 139 in the anti-theft apparatus 116 of FIG. 13B compared to the anti-theft apparatus 116 of FIG. 13A. Again, and as noted above, various other numbers of fingers and/or tunnels, such as removing the fingers and/or adding more fingers, may alternatively be included and still fall within the scope of the present disclosure. Further, various sizes, shapes, widths, and lengths of each finger may alternatively be provided and still fall within the scope of the present disclosure. Parts of the anti-theft apparatus of FIG. 13B that are the same or essentially the same as parts of the anti-theft apparatus 116 of FIG. 13A have the same reference numbers and are not explained again here for the sake of brevity.

Referring now to FIGS. 14-18, an anti-theft system 210 having an anti-theft apparatus 216 according to another aspect of the present disclosure is depicted. Like the anti-theft apparatus 16 and 116, the anti-theft apparatus 216 is coupled to a fixture 212 to secure one or more cosmetic products 214 to the fixture 112. Parts of the anti-theft apparatus 16 and 116 that are similar to parts of the anti-theft apparatus 216 are numbered 200 more than the parts of the anti-theft apparatus 16.

Figure 14:
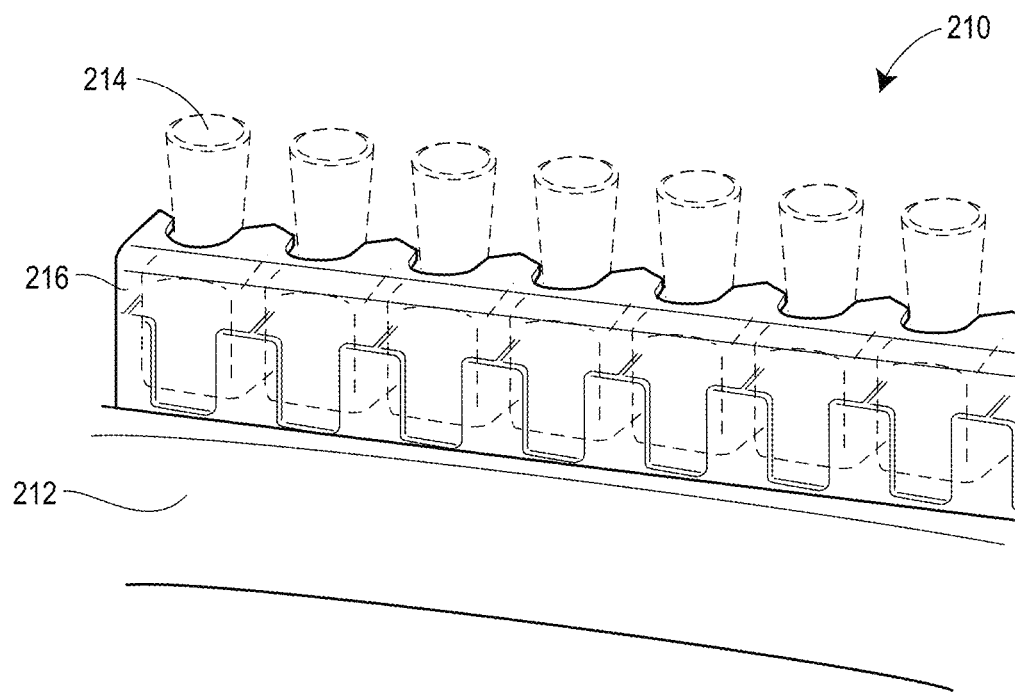
FIG. 14 is a perspective view of another anti-theft system according to another aspect of the present disclosure.
Figure 15:
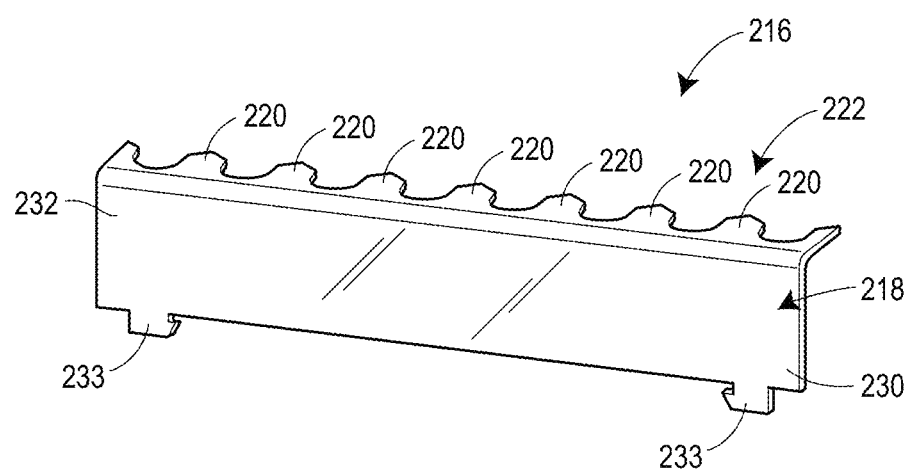
FIG. 15 is a perspective view of an anti-theft apparatus of the anti-theft system of FIG. 14.

Referring now to FIGS. 14 and 15, and like the anti-theft apparatus 16 and 116, the anti-theft apparatus 216 includes a base 218 and at least one finger 220 extending from the base 218 and adapted to contact at least one cosmetic product 214 (FIG. 14) disposed within the fixture 212. In addition, and as explained more below, the at least one finger 220 secures the at least one cosmetic product 214 to the fixture 212, making rapid removal of a large quantity of cosmetic products 214 from the fixture 112 difficult.

Figure 16:
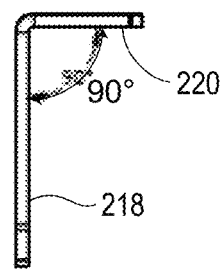
FIG. 16 is a side view of the anti-theft apparatus of FIG. 15.

The base 218 includes two ends 230, 232 and a tab 233 downwardly extending from each end 230, 232 of the base 218. Each tab 233 is adapted to be inserted into a slot (not depicted) in the fixture 212 to couple the anti-theft apparatus 216 to the fixture 212. In addition, the at least one pusher 220 may include a plurality of fingers 222 (FIG. 15), and the plurality of fingers 222 may include a plurality of pushers 222 inwardly extending from the base 218. In some examples, and as depicted in FIG. 16, at least one pusher 220 is disposed perpendicular to the base 218. Said another way, the at least one pusher 220 may be disposed at an angle of 90 degrees from the base 218. In another example, each pusher 220 of the plurality of pushers 222 may be disposed perpendicular to, i.e., 90 degrees from, the base 218.

Figure 17:
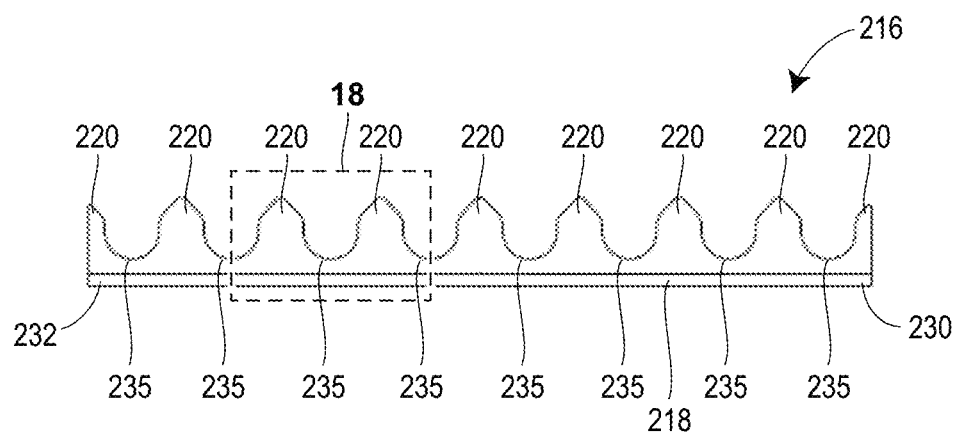
FIG. 17 is a top view of the anti-theft apparatus of FIG. 15.
Figure 18:
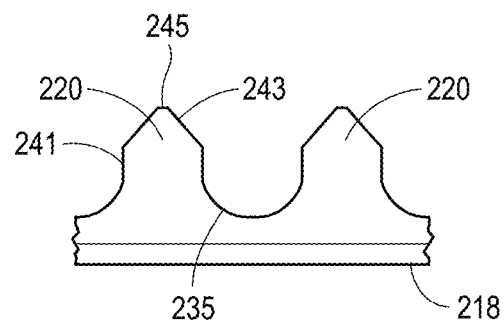
FIG. 18 is a close-up view of a portion of the anti-theft apparatus of FIG. 16 marked B.

Referring now to FIGS. 17 and 18, the anti-theft apparatus 216 may further include a collar 235 disposed between at least two pushers 220 of the plurality of pushers 222. In some examples, the collar 235 is disposed between the pushers 220 of the plurality of pushers 222, as depicted in FIG. 17. At least one collar 235, and in some examples, all the collars 235 are adapted to engage a portion of at least one cosmetic product 214 (see FIG. 14). In this way, the cosmetic products 214 are secured to fixture 212 via the anti-theft apparatus 216.

In some examples, and as depicted in FIG. 18, the at least one pusher 220 may include a curved base 241 and angled side portions 243 extending from the curved base 241. The angled side portions 243 extend toward each other to form a pointed area 245. In addition, at least one collar 235 may include a semi-circular shape, as also depicted in FIG. 18. Alternatively, each of the at least one pusher 220 and the at least one collar 235 may take the form of various other shapes and still fall within the scope of the present disclosure.

Figure 19:
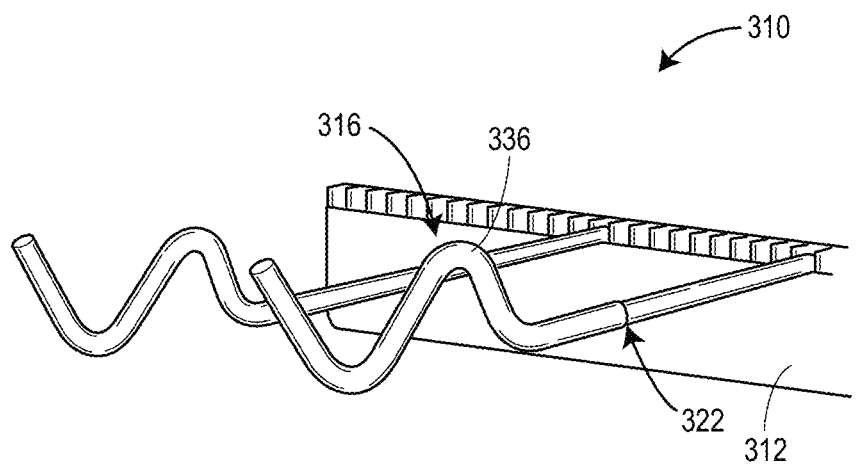
FIG. 19 is a perspective view of another anti-theft apparatus of the present disclosure.
Figure 20:
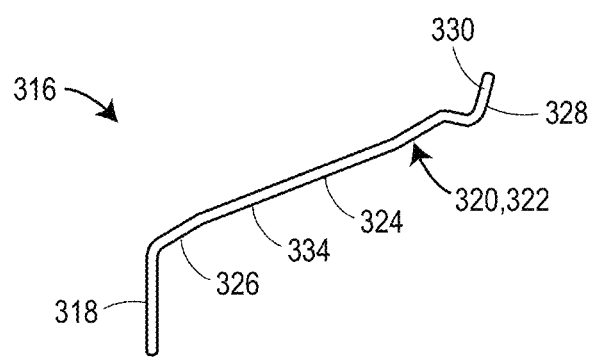
FIG. 20 is a perspective view of another anti-theft apparatus of the present disclosure.
Figure 21:
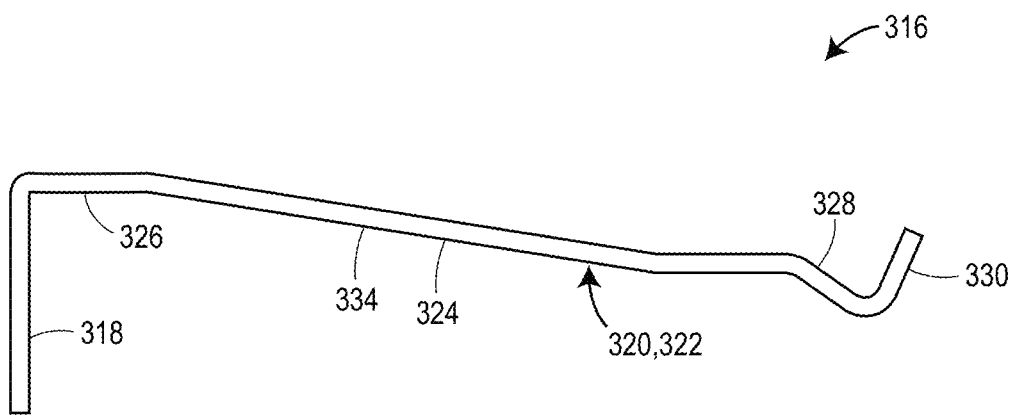
FIG. 21 is a side view of the anti-theft apparatus of FIG. 20.

Referring now to FIGS. 19-21, an anti-theft system 310 having an anti-theft apparatus 316 according to another aspect of the present disclosure is depicted. Like the anti-theft apparatus 16, 116, 216, the anti-theft apparatus 316 is coupled to a fixture 312 to secure one or more cosmetic products 14, 114, 214 to the fixture 112. Parts of the anti-theft apparatus 16, 116, 216 that are similar to parts of the anti-theft apparatus 316 are numbered 300 more than the parts of the anti-theft apparatus 16.

Referring now to FIGS. 20 and 21, and like the anti-theft apparatus 16, the anti-theft apparatus 316 includes a base 318 and at least one finger 320 extending from the base 318 and adapted to contact at least one cosmetic product 14, 114 disposed within the fixture 312. In addition, and as explained more below, the at least one finger 320 secures the at least one cosmetic product 114 to the fixture 312, making rapid removal of a large quantity of cosmetic products 314 from the fixture 312 difficult.

In this example, the at least one finger 320 is at least one peg hook 322. The peg hook 322 includes a body 324 having a first end 326 disposed near and adapted to be coupled to the base 318 and a second end 328 disposed on the other end of the body 324. The second end 328 includes a hook 330, which may be upwardly extending from the body 324 and through which the at least one cosmetic product 14, 114, 214 is moved to remove the at least one cosmetic product 14, 114, 214 from the fixture 312. Said another way, upon coupling the anti-theft apparatus 316 to the fixture 312 (FIG. 19), one or more cosmetic products, such as the cosmetic products 14, 114, 214, may be disposed onto the peg hook 322. In some examples, the cosmetic products 14, 114, 214 include packaging (not depicted) having an aperture (not shown) into which the peg hook 322 is inserted, such that the cosmetic products 14, 114, 214 are displayed on the peg hooks 322 coupled to the fixture 312.

In this example, the at least one peg hook 322 also includes a coating 334. The coating 334 may include one or more of a powder texture or a rubber dip, each of which creates friction against removal of the cosmetic product 14, 114, 214 disposed on the peg hook 322 upon movement of the cosmetic product 14, 114, 214 off of the peg hook 322.

In this way, the coating 334 and shape of the peg hook 322 slow down removal of each of cosmetic product 14, 114, 214 disposed on the peg hook 322, reducing the risk of rapid theft of large amounts of cosmetic products from the fixture 312. In another example, and as depicted in FIG. 19, the peg hook 322 may further include a notch 336, such as a middle notch, which further prevents cosmetic products 14, 114, 214 from being quickly removed from the fixture 312.

In view of the foregoing, it will be appreciated that the anti-theft apparatus 16, 116, 216 may be coupled to the fixture 12, 112, 212 to secure at least one cosmetic product 14, 114, 214 to the fixture according to the following exemplary method. In particular, and in one example, a method of securing the at least one cosmetic product 14, 114, 214 to the fixture 12, 112, 212 comprises providing the anti-theft apparatus 16, 116, 216 having the base 18, 118, 218 with at least one tab 25, 137, 147, 233 and a plurality of fingers 20, 120, 220.

In addition, the method further includes coupling the anti-theft apparatus 16, 116, 216 to the fixture 12, 112, 212 via the at least one tab 25, 137, 147, 233. In one example, coupling the anti-theft apparatus 16, 116, 216 to the fixture 12, 112, 212 may comprise inserting the tab 25 disposed on each end of the bracket 24 attached to each end of the base 18 into a slot in the fixture 12. In another example, coupling the anti-theft apparatus 16, 116, 216 to the fixture 12, 112, 212 may comprise inserting the tab 137 or 147 disposed on each shoulder 135 extending from each end 130, 132 of the base 118 into a slot (not depicted) in the fixture 112. In yet another example, coupling the anti-theft apparatus 16, 116, 216 to the fixture 12, 112, 212 may comprise inserting the tab 233 disposed on each end 230, 232 of the base 218 into a slot (not depicted) in the fixture 212.

Further, the method also includes securing the at least one cosmetic product 14, 114, 214 to the fixture 12, 112, 212 via the at least one finger 20, 120, 220 of the plurality of fingers 22, 122, 222. In one example, securing the at least one cosmetic product 14, 114, 214 to the fixture 12, 112, 212 via the at least one finger 20, 120, 220 of the plurality of fingers 22, 122, 222 may comprise disposing the projection 28 of the at least one finger 20 of the plurality of fingers 22 into contact with the at least one cosmetic product 14, such that movement of the at least one finger 20 is required to access the at least one cosmetic product 14. In another example, securing the at least one cosmetic product 14, 114, 214 to the fixture 12, 112, 212 via the at least one finger 20, 120, 220 of the plurality of fingers 22, 122, 222 may comprise disposing the at least one finger 120 of the plurality of fingers 122 on either side of the at least one cosmetic product 114, forming a tunnel 139 for receiving the at least one cosmetic product 114. In yet another example, securing the at least one cosmetic product 14, 114, 214 to the fixture 12, 112, 212 via the at least one finger 20, 120, 220 of the plurality of fingers 22, 122, 222 may comprise, wherein the plurality of fingers comprises a plurality of pushers 222, disposing at least one pusher 220 of the plurality of pushers 222 on either side of at least one cosmetic product 214 and engaging the at least one cosmetic product 214 with a collar 235 disposed between two pushers 220 of the plurality of pushers 222.

In view of the foregoing, it will be appreciated that the anti-theft systems 10, 110, 210, 310 of the disclosure include anti-sweep features, which prevent cosmetic products 14, 114, 214, from being swept off of the fixtures 12, 112, 212, 312 in large quantities, reducing the loss of cosmetic products from theft. Said another way, the anti-theft apparatus 16, 116, 216 slow down shelf sweeping by professional shoppers, for example. Moreover, the anti-theft systems 10, 110, 210, 310, in particular, the anti-theft apparatus 16, 116, 216, 316 further prevent large amounts of cosmetic products 14, 114, 214 to be removed from the fixture 12, 112, 212, significantly reducing amount of loss due to theft of cosmetic products 14, 114, 214. Still further, the anti-theft apparatus 16, 116, 216, 316 of the present disclosure are able to be coupled to existing in-store fixtures 12, 112, 212, reducing overall cost of the anti-theft systems 10, 110, 210. Moreover, the tunnels 139 of the anti-theft apparatus 116 allow access to only one cosmetic product 114 at a time, further reducing, if not eliminating, shelf sweeping of large amounts of cosmetic products 114, for example. Also, the base 218 and pushers 220 of the anti-theft apparatus 216 keep the cosmetic products 214 pushed into the collar 235 and block stocked cosmetic products 214, again preventing shelf sweeping of large amounts of cosmetic products 214, for example.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein any reference to "one implementation," "one embodiment," "one example," "an implementation," "an embodiment," or "an example" means that a particular element, feature, structure, or characteristic described in connection with the implementation is included in at least one implementation. The appearances of the phrase "in one implementation" or "in one embodiment" or "in one example" in various places in the specification are not necessarily all referring to the same implementation.

Some implementations may be described using the expression "coupled" along with its derivatives. For example, some implementations may be described using the term "coupled" to indicate that two or more elements are in direct physical or electrical contact. The term "coupled," however, may also mean that two or more elements are not in direct contact with each other, but yet still co-operate or interact with each other. The implementations are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the implementations herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for inspecting a structure to estimate the condition of a structure through the disclosed principles herein. Thus, while particular implementations and applications have been illustrated and described, it is to be understood that the disclosed implementations are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. An anti-theft system for cosmetic products, the anti-theft system comprising:
   a fixture adapted to receive cosmetic products;
   an anti-theft apparatus coupled to the fixture, the anti-theft apparatus having a base and at least one finger extending from the base, the at least one finger adapted to one or more of contact or be disposed adjacent to at least one cosmetic product disposed within the fixture and the base including two ends and a plurality of apertures disposed on either end; and
   a bracket coupled to the base, the bracket including two ends, each end having an aperture adapted to be aligned with at least one aperture of the plurality of apertures in the base to couple the bracket to the base via a fastening member, each end of the bracket further including a tab adapted to be coupled to a portion of the fixture,
   where the at least one finger includes an end having a projection downwardly extending from the end and is adapted to secure the at least one cosmetic product to the fixture,
   where the base includes a longitudinal axis, and the at least one finger extends from the base in a direction perpendicular to the longitudinal axis of the base and the projection downwardly extends from the end in a direction substantially parallel to the longitudinal axis, and
   where the base, the at least one finger, and the projection are formed of one piece.

2. The anti-theft system of claim 1, where at least one aperture of the plurality of apertures is adapted to receive a fastening member to set a height of the anti-theft apparatus relative to the fixture.

3. The anti-theft system of claim 1, wherein the at least one finger includes a plurality of fingers, and at least one finger of the plurality of fingers is individually adjustable relative to one or more of the base and another finger of the plurality of fingers.

4. The anti-theft system of claim 1, wherein the at least one finger includes a plurality of fingers, and the projection to wrap over a portion of the at least one cosmetic product disposed on the fixture.

5. The anti-theft system of claim 1, the base including two ends and a shoulder portion downwardly extending from each end, the at least one finger disposed between the shoulder portions, and each shoulder portion including an inwardly extending tab adapted to be coupled to a portion of the fixture.

6. The anti-theft system of claim 5, wherein the at least one finger includes a plurality of fingers, and the at least one finger of the plurality of fingers is adapted to be disposed on a side of the at least one cosmetic product, the plurality of fingers forming at least one tunnel to receive and to secure the at least one cosmetic product to the fixture.

7. The anti-theft system of claim 5, wherein each shoulder further includes a downwardly extending projection having an inwardly extending flange and a tab extending from the flange, the tab adapted to be inserted into a portion of the fixture to set a height of the anti-theft apparatus relative to the fixture.

8. The anti-theft system of claim 1, wherein the base includes two ends and a tab downwardly extending from each end of the base, each tab adapted to be inserted into a slot in the fixture to couple the anti-theft apparatus to the fixture.

9. The anti-theft system of claim 8, wherein the at least one finger comprises a plurality of fingers, the plurality of fingers including a plurality of pushers inwardly extending from the base, and further comprising a collar disposed between at least one pusher of the plurality of pushers, the collar adapted to engage the at least one cosmetic product.

10. The anti-theft system of claim 1, wherein the fixture is a tray including the at least one cosmetic product.

11. An anti-theft apparatus for use with a fixture having cosmetic products, the anti-theft apparatus comprising:
    a base having two ends, a plurality of apertures disposed on either end, and one of a shoulder portion or a tab extending from the base, the one of the shoulder portion or the tab adapted to be coupled to the fixture;
    a plurality of fingers extending from the base and adapted to one or more of contact or be disposed adjacent to at least one cosmetic product disposed within the fixture and secure the at least one cosmetic product to the fixture, and where at least one finger of the plurality of fingers includes an end having a tab downwardly extending from the end, where the base includes a longitudinal axis, and the at least one finger extends from the base in a direction perpendicular to the longitudinal axis of the base and the tab downwardly extending from the end in a direction substantially parallel to the longitudinal axis, and where the base, the at least one finger, and the tab are formed of one piece; and
    a bracket coupled to the base, the bracket including two ends, each end having an aperture adapted to be aligned with at least one aperture of the plurality of apertures in the base to couple the bracket to the base via a fastening member, each end of the bracket further including a tab adapted to be coupled to a portion of a fixture.

12. The anti-theft apparatus of claim 11, where the plurality of fingers outwardly extend from the base and at least one finger of the plurality of fingers is individually adjustable relative to at least one other finger of the plurality of fingers the tab adapted to wrap over a portion of at least one cosmetic product disposed on the fixture.

13. The anti-theft apparatus of claim 11, wherein the base includes the shoulder portion extending from each end and the plurality of fingers are disposed between the shoulder portions and adapted to be disposed on either side of the at least one cosmetic product, the plurality of fingers forming at least one tunnel adapted to receive and to secure the at least one cosmetic product to the fixture.

14. The anti-theft apparatus of claim 11, wherein the plurality of fingers includes a plurality of pushers inwardly extending from the base, and further comprising a collar disposed between at least two pushers of the plurality of pushers, the collar adapted to engage the at least one cosmetic product.

15. A method of securing at least one cosmetic product to a fixture, the method comprising:
providing an anti-theft apparatus comprising a base having at least one tab, a plurality of fingers, two ends, and a plurality of apertures disposed on either end;
coupling a bracket to the base, the bracket including two ends, each end having an aperture adapted to be aligned with at least one aperture of the plurality of apertures in the base to couple the bracket to the base via a fastening member, each end of the bracket further including a tab adapted to be coupled to a portion of the fixture
coupling the anti-theft apparatus to the fixture via the at least one tab; and
securing the at least one cosmetic product to the fixture via at least one finger of the plurality of fingers, the at least one finger including an end having a projection downwardly extending from the end and the base including a longitudinal axis, the at least one finger extending from the base in a direction perpendicular to the longitudinal axis of the base and the projection downwardly extending from the end in a direction substantially parallel to the longitudinal axis, where the base, the at least one finger, and the projection are formed of one piece.

16. The method of claim 15, wherein coupling the anti-theft apparatus to the fixture via the at least one tab of the base comprises one of: (1) inserting a tab disposed on the bracket attached to the base into a slot in the fixture; (2) inserting a tab disposed on each end of a shoulder extending from each end of the base into a slot in the fixture; or (3) inserting a tab disposed on each end of the base into a slot in the fixture.

17. The method of claim 15, wherein securing the at least one cosmetic product to the fixture via at least one finger of the plurality of fingers comprises one of: (1) disposing a tab of at least one finger of the plurality of fingers into contact with at least one cosmetic product, such that movement of the at least one finger is required to access the at least one cosmetic product; (2) disposing at least one finger of the plurality of fingers on either side of the at least one cosmetic product, forming a tunnel for receiving the at least one cosmetic product; and (3) the plurality of fingers comprising a plurality of pushers, and disposing at least one pusher of the plurality of pushers on either side of at least one cosmetic product and engaging the at least one cosmetic product with a collar disposed between two pushers of the plurality of pushers.

* * * * *